United States Patent [19]

Tarantino

[11] Patent Number: 4,611,424
[45] Date of Patent: Sep. 16, 1986

[54] SELECTABLE ENTRY SHELLFISH TRAP

[76] Inventor: John L. Tarantino, 4396 Arcadia Dr., San Diego, Calif. 92106

[21] Appl. No.: 680,771

[22] Filed: Dec. 12, 1984

[51] Int. Cl.$^4$ ............................................. A01K 69/08
[52] U.S. Cl. ........................................ 43/100; 43/102
[58] Field of Search ................... 43/65, 100, 101, 102, 43/103, 104, 105

[56] References Cited

U.S. PATENT DOCUMENTS

| | | |
|---|---|---|
| 885,671 | 4/1908 | Eason ..................................... 43/100 |
| 1,619,366 | 3/1927 | Petersen ................................ 43/100 |
| 2,111,959 | 3/1938 | Baxter ................................... 43/100 |
| 2,119,828 | 6/1938 | Nordenstam ........................ 43/100 |
| 2,578,172 | 12/1951 | Burton ................................... 43/65 |
| 3,271,894 | 9/1966 | Manno et al. ......................... 43/65 |
| 3,497,989 | 3/1970 | Schultz et al. ....................... 43/100 |
| 3,795,073 | 3/1974 | Olsen .................................... 43/105 |
| 4,184,283 | 1/1980 | Wyman ............................... 43/65 X |
| 4,509,288 | 4/1985 | Shepherd ............................. 43/102 |

OTHER PUBLICATIONS

Official Gazette of Dec. 24, 1972, p. 1161, citing the patent to Lankenau, U.S. Pat. No. 3,699,702.

Primary Examiner—Nicholas P. Godici
Assistant Examiner—M. Jordan
Attorney, Agent, or Firm—Brown, Martin & Haller

[57] ABSTRACT

A joinable two-section molded plastic cage-like enclosure having by a top and bottom member with a peripheral side wall therebetween. The top and bottom members have an elliptical plan shape. Two oppositely positioned converging entrance passages extend from the side wall to the interior of the enclosure and provide a continuous firm surface to support the entry of shellfish into the trap enclosure. Removable blocking members at the interior end of the passages permit selection of the size of the trap opening and prevent the escape of shellfish from the passages. Bait holders are mounted within the enclosure between the top and bottom members substantially opposite the entrance passages.

4 Claims, 8 Drawing Figures

SELECTABLE ENTRY SHELLFISH TRAP

BACKGROUND OF THE INVENTION

The present invention relates to fishing equipment, and more particularly to bottom traps for catching shellfish such as lobster, crab and shrimp.

Baited bottom traps for catching shellfish have long been employed by fisherman. The usual such trap is hand made and consists of a floodable wooden or wire enclosure of square or rectangular form with an inwardly converging entrance passage extending from the side or top of the enclosure to the interior thereof. Traps of wooden construction deteriorate rapidly in use since they are subject to rot and attack by marine organisms. Wire traps are subject to corrosion in a sea water environment. Because of these factors many available shellfish traps have a limited useful life and require great expenditure of time and resources for their maintenance.

In many trap designs, the entrance passage is formed by netting or wire to provide the footing necessary for the catch to enter the trap and establish the size of the trap opening. These latter constructions are also subject to rapid deterioration in a marine environment, and in addition, the size of the trap opening cannot be readily changed.

The foregoing difficulties are partially overcome by use of traps formed of molded plastic and having plastic entrance passages with flexible interior terminations. U.S. Pat. No. 3,271,894 shows a design of such a plastic shellfish trap entrance passage. U.S. Pat. No. 3,497,989 discloses a shellfish trap formed entirely of plastic material with entrance passages terminating in flexible members. The latter two designs provide a continuous firm transit surface for the entering catch for part of the passage length, but terminate in converging resilient finger-like members at the interior end of the trap entrance passage. Such passage construction permits entry of shellfish of varying size, and the flexibility of the resilient fingers prevents escape, since they will not support the weight of shellfish seeking to get out of the trap. Although presenting advantages, experience has demonstrated that the trap passage designs of the above referenced patents do not provide the desired control of the trap entrance size. Fishermen endeavor to overcome this by bending the resilient members inwardly to reduce the trap opening. However, taking such action causes the entrance passage to become discontinuous and irregular which inhibits the entry of shellfish, particularly lobster, into the trap. It is desirable therefore to provide a shellfish trap which overcomes difficult manufacturing and maintenance problems long associated with such equipment, is easily used and stored, and which also may be readily configured to accommodate a shellfish catch of particular size and type.

SUMMARY OF THE INVENTION

According to the precepts of the invention, a plastic shellfish trap is provided for positioning on the sea floor which has selectable entry capability. In the illustrated embodiment, a cage-like enclosure is formed of two joinable sections to have a top and bottom member with a peripheral side wall therebetween. The top and bottom members are of elliptical plan shape. Two generally oppositely positioned entrance passages extend from the enclosure side wall to the interior of the trap enclosure to permit access thereto by shellfish. Bait holders mounted within the enclosure substantially opposite the entrace passages attract the shellfish when baited. The elliptical plan shape of the trap permits a guided gradual approach to the trap entrances by shellfish seeking the bait.

According to further precepts of the invention, the entrance passages provide a continuous support path to the interior of the trap enclosure. Removable blocking members at the interior end of the passages permit selection of the size of the trap opening according to the size and type of shellfish to be caught and prevent the escape of the catch from the passages.

It is therefore an advantage of the invention to provide a new and improved shellfish trap. The trap curved plan shape is such as to direct shellfish attracted by the bait to the trap entrance passages in a gradually guided manner. The entrance passages provide wide and continuous surfaces to support the entry of the catch into the trap and prevent their escape. Trap entry size may be readily adapted to the size and type of shellfish to be caught. The trap is formed of molded plastic, is resilient, and resists the adverse effects of sea water and abrasion. The trap can be conveniently stored, and is easily assembled and used. Other advantages of the invention will become more apparent upon a reading of the following detailed description in conjunction with the drawings, in which like reference numerals refer to like parts throughout.

DETAILED DESCRIPTION OF THE DRAWINGS

Figure 1:
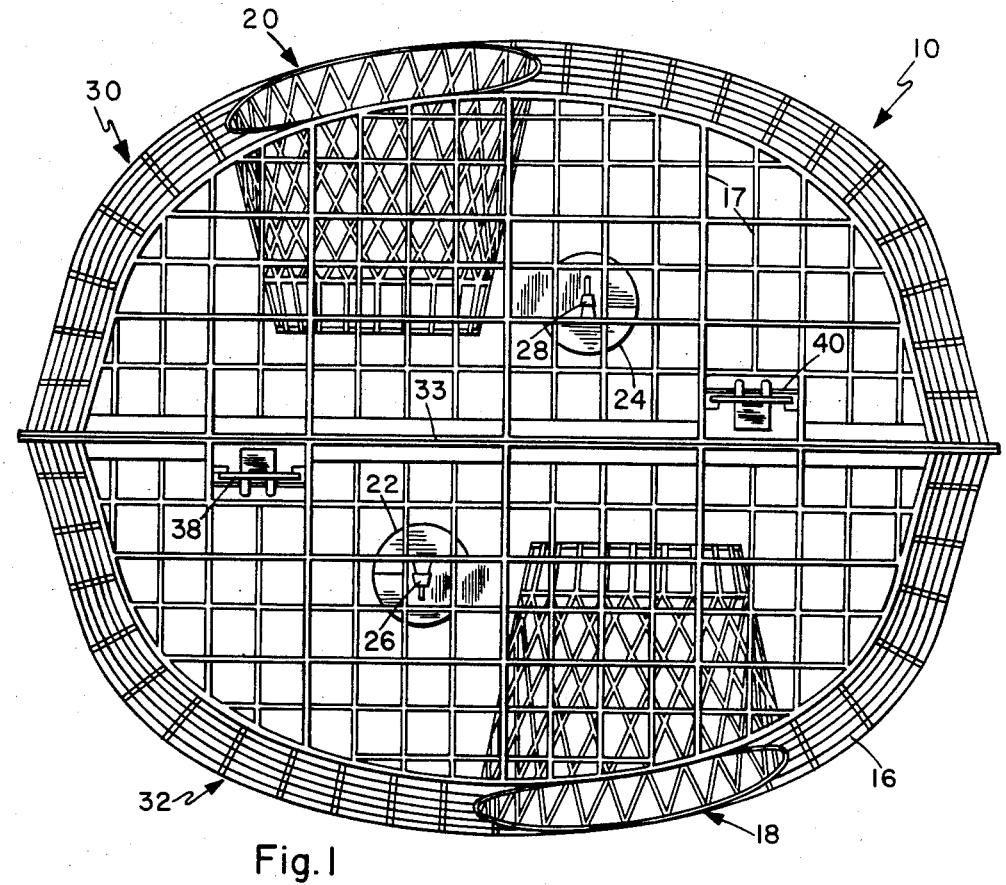
FIG. 1 is a top plan view of the assembled shellfish trap.
Figure 2:
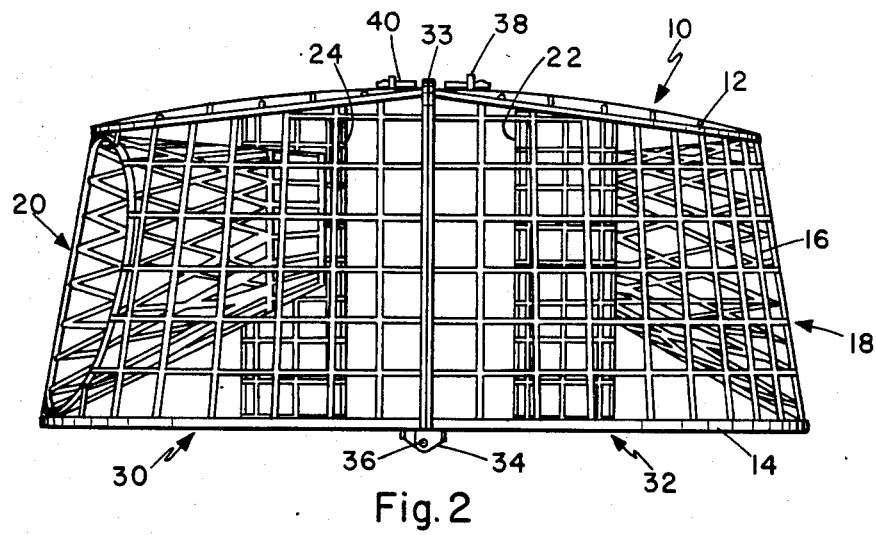
FIG. 2 is an end view of the shellfish trap.

The assembled configuration and construction of the shellfish trap 10 is illustrated in FIGS. 1 and 2. The trap is designed for catching a variety of shellfish depending upon the selected configuration, including lobster, crab and shrimp. The trap 10 is essentially an enclosure having a top member 12, a bottom member 14 and a peripheral upwardly and inwardly sloping side wall 16, all of which are of floodable cage-like construction. In use, the bottom member 14 of the trap rests upon the ocean floor which is not shown. As viewed from above, the trap 10 has an elliptical plan shape which contributes to the efficiency of the trap by providing a guided curved path directed toward the trap entrances and the bait therein.

In the embodiment illustrated two substantially opposed entrance passages 18 and 20 lead from the bottom edge of the side wall 16 to the interior of the trap to provide a pathway for the entry of the catch. Two removable bait holders 22 and 24 mount within the trap by notch connections 26 and 28 respectively formed in the top member 12. Corresponding connections in the bottom member 14 of the trap secure the bait holders vertically. The bait holders are positioned substantially opposite the interior ends of the entrance passages 18 and 20 to present the bait at an advantageous position relative to the entry passages 18 and 20.

Figure 4:
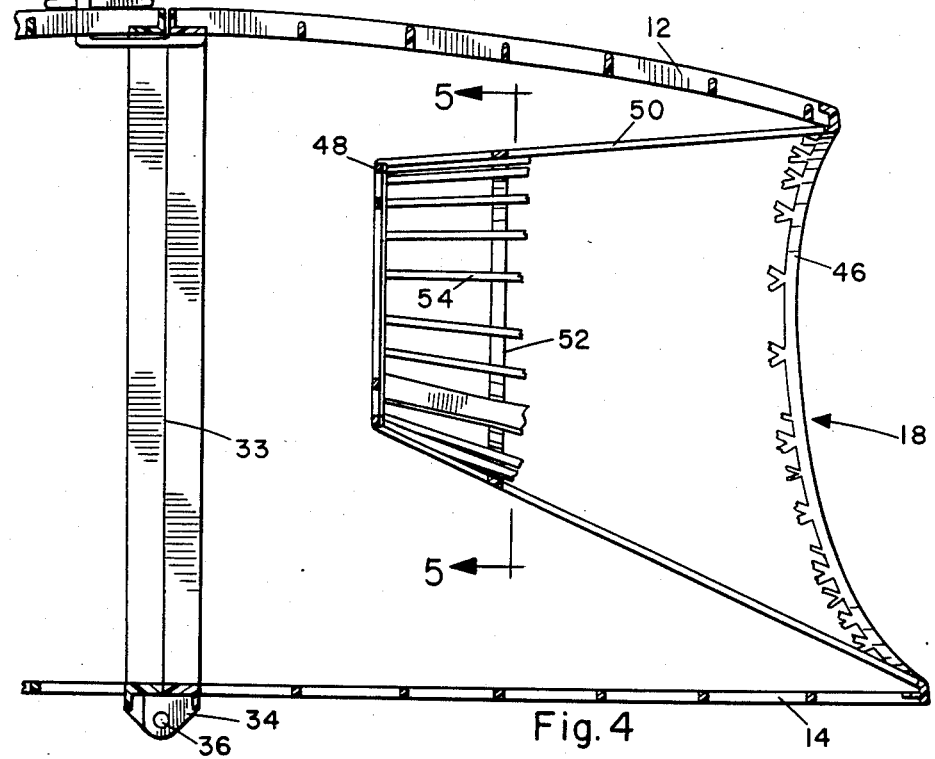
FIG. 4 is a sectional view taken on line 4—4 of FIG. 3, portions of the trap structure being cut away.

The assembled trap 10 is made up of two half sections 30 and 32 formed of molded plastic. The sections are hingedly joined together to form the trap enclosure along a center line indicated at 33 which includes the major axes of the elliptical top member 12 and bottom member 14. Hinge 34 with removable hinge pin 36 is illustrative of one of a pair of hinges which connect the sections 30 and 32 together to form the bottom member 14. The sections are secured together to form the trap top member 12 by locks 38 and 40. The locks 38 and 40 are each formed by a tongue 42 of one member which passes through an opening in the opposite section, and is pinned in place by a removable lock form 44 (FIG. 4). The design is such that the trap 10 may be opened by releasing locks 38 and 40 and separating the half sections by rotation about the hinges 34. Employing these features, the catch may be removed, the bait holders restocked, and the trap returned to use quickly and easily. Alternatively, the trap sections 30 and 32 may be completely separated by removal of the hinge pins 36 and the lock forks 44 for repair or storage. When separated, the design of the trap sections 30 and 32 is such that one section may be fitted inside the other for stacked storage.

Figure 3:
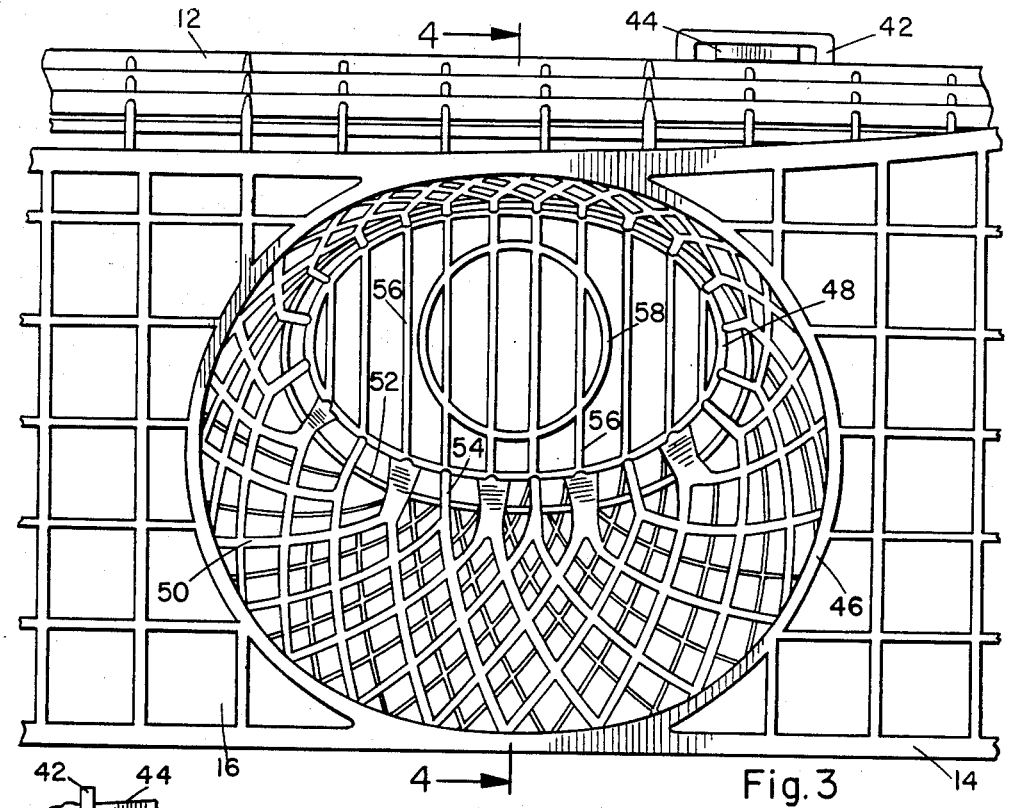
FIG. 3 is an enlarged side elevation view showing one of the trap entry passages.

The construction of a trap entry passage 18 or 20 is illustrated in FIGS. 3 and 4. Each of the passages has an entrance port 46 formed in the trap wall 16 and tangential to the bottom member 14. The passage terminates in an exit port 48 in the interior of the trap enclosure. A structure 50 is formed with, and extends between the passage entrance port 46 and exit port 48. The ports 46 and 48 define eliptical openings with major axes substantially parallel to the plane of the trap bottom member 14 to maximize the width of the entrance passage. The exit port 48 is smaller than the entrance port 46 and is located above the trap bottom member 14 to prevent the escape of shellfish which have fallen into the trap. The structure 50 has a close lattice-like form from the entrance port 46 to a support ring 52 in order to provide a surface with good footing for shellfish. From support ring 52 to the exit port 48, the surface of structure 50 is continued as closely spaced generally linear members 54 to simplify the molding of the trap 10. The passages 18 and 20 thus provide upwardly and inwardly converging entrances to the trap 10 with continuous support surfaces for transitting shellfish.

Figure 5:
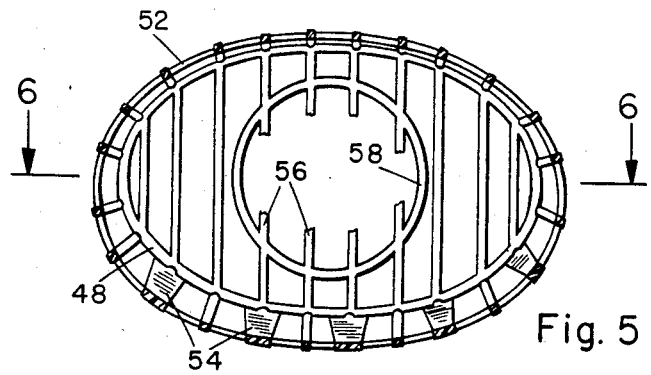
FIG. 5, is a sectional view taken on line 5—5 of FIG. 4, showing an exit port of an entry passage partially opened up.
Figure 6:
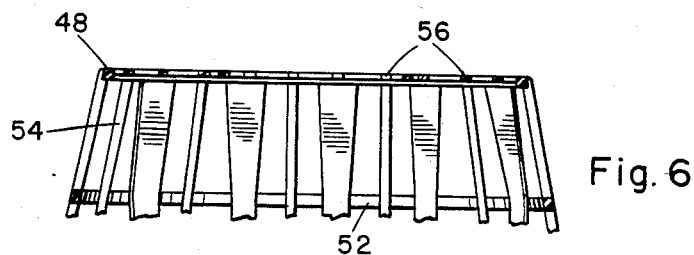
FIG. 6 is a section view taken on line 6—6 of FIG. 5.

As manufactured, the opening defined by the exit port 48 is blocked by spaced vertical support members 56 and an exit ring 58 positioned substantially at the center of the exit port 48. The support members 56 and the exit ring 58 are molded integrally with the exit port 48. To selectively adapt the trap 10 for catching particular shellfish, the size of the opening in the exit port is adjusted by removing the support members 56 or portions thereof. Since the support members 56 are of plastic construction this may be easily accomplished by cutting them as with a knife or clippers. FIG. 5 illustrates an adaptation of the trap for catching small shrimp. For this use, portions of the support members 56 within the exit ring 58 are cut away to provide a trap entry of desired size. As can be readily understood, the support members 56 may be removed to establish the entire opening in the exit ring 58 as the entrance into the trap 10. Similarly, to adapt the trap 10 to catch larger shellfish such as lobster or crab, the support members 56 extending across the exit port 48, including the support exit ring 58, are removed as illustrated in FIG. 7.

Figure 7:
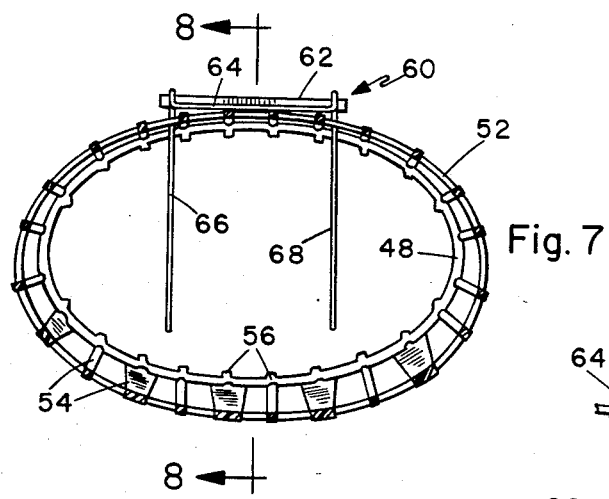
FIG. 7 is a view similar to FIG. 5, with the exit port of the passage fully opened and with a blocking spring installed.
Figure 8:
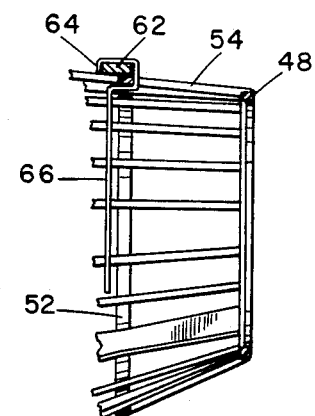
FIG. 8 is a sectional view taken on line 8—8 of FIG. 7.

With the exit port 48 fully opened as illustrated in FIG. 7, it has been found that some shellfish, particularly crab, have the ability to back away or turn about to avoid passing through the exit port 48 and falling into the trap. To prevent such escapes, a spring assembly 60 is provided which is removably mountable on the trap 10 at the location of support ring 52 as illustrated in FIGS. 7 and 8. The spring assembly 60 includes a spring bar 62 to which is attached, as by bonding, a spring 64 with extended arms 66 and 68. As illustrated in FIG. 8, the spring arms wrap about the spring bar 62 but are spaced therefrom so as to form a clip attachable to the support ring 52. To use the spring assembly 60, the spring arms 66 and 68 are inserted through the structure 50 to block the trap passage. The design of the spring is such that it permits entry into the trap, but prevents the transit of shellfish in the opposite direction.

OPERATION

The use of the shellfish trap 10 will be described with reference to FIGS. 1, 3 and 5. The half sections 30 and 32 of the trap 10 are joined together by hinges 34. With the sections swung apart, the size of the passage exit port openings are established by removal of support members 56 depending upon the type and size of the catch desired. The bait holders 22 and 24 are filled and mounted to the trap top member 12 and bottom member 14. Sections 30 and 32 may then be swung together and secured by locks 38 and 40. Trap is then ready to be placed upon sea floor. When the trap is raised, the catch may be easily withdrawn and the bait holders refilled by releasing the locks 38 and 40 and swinging open the sections 30 and 32.

It is understood that variations in form of the invention disclosed herein may be made without departure from the spirit and scope of the invention as defined in the appended claims.

Having described my invention, what is claimed is:

1. A selectable entry shellfish trap, comprising:
    a cage-like enclosure having elliptically shaped top and bottom members and a peripheral side wall extending therebetween;
    a pair of substantially oppositely positioned entry passages extending from said side wall toward the center of said enclosure;
    each of said passages having an entrance port formed in said side wall, and an exit port within said enclosure;
    a peripheral structure extending between said entrance port and exit port of each passage for providing a continuous transitting surface for shellfish;
    means for selecting the size of said exit port according to the average size of shellfish to be caught, comprising an outer ring defining a first exit port size, an inner ring coplanar with the outer ring defining a smaller exit port size, and spaced support members extending across said exit port to support said inner ring, said support members comprising cuttable means for selectively cutting out and removing said inner ring to increase said exit port size;

means removably mountable on said structure adjacent said exit port opening for preventing the escape of shellfish from said passage; and means mountable between said top and bottom members substantially opposite said exit ports for holding bait.

2. A selectable entry shellfish trap as recited in claim 1 wherein:

said entrance and exit ports defined elliptically shaped openings with the major axis parallel to said enclosure bottom member.

3. A selectable entry shellfish trap as recited in claim 1, wherein said support members comprise:

removable support members formed integrally with said inner and outer exit rings and extending across the openings therein in spaced relationship to block said openings, each support member being selectively cuttable at any point in its length for unblocking either of the openings to select the exit port size.

4. A selectable entry shellfish trap as recited in claim 1 wherein said escape prevention means includes:

a spring formed with two elongated arms comprising means for extending through said surface and into said passage; and means for mounting said spring to said surface with said arms extending into said passage, said arms comprising means for permitting the transit of shellfish through said passage in one direction only.

* * * * *